(12) United States Patent
Chen et al.

(10) Patent No.: US 11,228,384 B2
(45) Date of Patent: Jan. 18, 2022

(54) SIMULATION SYSTEM AND TESTING METHOD OF AIS SIGNALS FOR AIRBORNE RECEIVER

(71) Applicant: SHANGHAI ADVANCED AVIONICS CO., LTD., Shanghai (CN)

(72) Inventors: Difei Chen, Shanghai (CN); Qiang Sun, Shanghai (CN); Yingnan Lu, Shanghai (CN)

(73) Assignee: SHANGHAI ADVANCED AVIONICS CO., LTD., Shanghai (CN)

( * ) Notice: Subject to any disclaimer, the term of this patent is extended or adjusted under 35 U.S.C. 154(b) by 121 days.

(21) Appl. No.: 16/894,951

(22) Filed: Jun. 8, 2020

(65) Prior Publication Data
US 2020/0304220 A1    Sep. 24, 2020

Related U.S. Application Data

(63) Continuation of application No. PCT/CN2018/119659, filed on Dec. 7, 2018.

(30) Foreign Application Priority Data

Dec. 8, 2017    (CN) .......................... 201711292144.9

(51) Int. Cl.
*H04B 17/00* (2015.01)
*H04B 17/391* (2015.01)
(Continued)

(52) U.S. Cl.
CPC .......... *H04B 17/3912* (2015.01); *G01S 19/23* (2013.01); *H04B 17/0087* (2013.01);
(Continued)

(58) Field of Classification Search
CPC . H04B 1/06; H04B 1/16; H04B 17/20; H04B 17/3912; H04B 17/0087;
(Continued)

(56) References Cited

U.S. PATENT DOCUMENTS

2012/0263163 A1* 10/2012 Burzigotti ........... H04L 27/0014
                                                           370/344
2013/0275842 A1* 10/2013 Peach ................. G06F 11/0751
                                                           714/799
(Continued)

FOREIGN PATENT DOCUMENTS

CN      102034367 A      4/2011
CN      103631148 A      3/2014
(Continued)

OTHER PUBLICATIONS

PCT/CN1028/119659 ISR PCT/ISA210, Mail Date Feb. 28, 2019.

*Primary Examiner* — Tuan Pham
(74) *Attorney, Agent, or Firm* — IPro, PLLC

(57) ABSTRACT

The present invention discloses a simulation system and testing method of AIS signals for airborne receiver. The simulation system comprises: multiple AIS receivers for receiving AIS signals of vessels, each AIS receiver being respectively connected to a timing unit, and the multiple AIS receivers being connected to a centralized processor by means of a communication network; the centralized processor for combining data of the multiple AIS receivers, deleting redundant data, and forming an AIS database; a flight simulator for manipulating an altitude and direction of an aircraft, and simulating a flight path of a real aircraft; and an AIS signal generator for incorporating the AIS database according to an aircraft position and time point sent from the flight simulator, calculating all AIS signals received by the aircraft at the time point, and sending the AIS signals to an RF signal generator to generate VHF RF signals. The present invention resolves the issue of large differences between existing airborne AIS simulation tests and actual application scenarios, and is applicable to the development of a airborne AIS signal simulation and a testing apparatus.

8 Claims, 2 Drawing Sheets

(51) Int. Cl.
     *G01S 19/23*    (2010.01)
     *H04L 1/22*     (2006.01)
     *H04L 1/24*     (2006.01)
     *H04W 72/04*    (2009.01)

(52) U.S. Cl.
     CPC .............. *H04L 1/22* (2013.01); *H04L 1/24* (2013.01); *H04W 72/0446* (2013.01)

(58) Field of Classification Search
     CPC .......... G01S 19/23; G01S 19/31; G01S 19/40; G01S 19/42
     See application file for complete search history.

(56) References Cited

U.S. PATENT DOCUMENTS

2016/0284222 A1   9/2016  Nicholls et al.
2017/0256169 A1*  9/2017  Short ................. G08G 3/00

FOREIGN PATENT DOCUMENTS

| CN | 106021675 A | 10/2016 |
| CN | 106372316 A | 2/2017 |
| CN | 107395267 A | 11/2017 |
| CN | 108055068 A | 5/2018 |

\* cited by examiner

SIMULATION SYSTEM AND TESTING METHOD OF AIS SIGNALS FOR AIRBORNE RECEIVER

TECHNICAL FIELD

The present invention relates to a signal simulation system and testing method, in particular relates to a simulation system and testing method of AIS signals for airborne receiver.

BACKGROUND

At present, a large number of vessels are equipped with Automatic Identification System (AIS) shipboard equipment, which broadcasts the dynamic and static information of the vessel to other vessels nearby and shore stations through VHF channel, including the dynamic information of the vessels such as the identify code, position, course and speed, as well as the static information of the vessels such as the ship name, call sign, draft and dangerous goods, so that the adjacent vessels and shore stations can master traffic situation of all the vessels nearby in time, to improve shipping safety.

AIS works on the VHF channel. The general radio transmission characteristic of VHF is line-of-sight. The receiving distance between the ship and the shore station is related to the altitude of the antenna. Considering atmospheric factors, the propagation distance can be expressed by the following formula:

$$D=4.12\times(\sqrt{ht}+\sqrt{hr})(km)$$

In the formula, D is the receiving distance, the unit is km; ht is the antenna altitude of radio transmitting equipment above sea level, the unit is m; hr is the altitude of the receiving antenna, the unit is m.

If the vessels' AIS antenna altitude is 10 m and the shore station AIS antenna altitude is 30 m, the shore station reception distance is generally 30 to 40 km.

In order to expand the ability to receive AIS signals on the sea, the AIS signals can be received through aircraft, such as fixed-wing aircraft, helicopters, gas boats, balloons, etc. The corresponding airborne equipment is called the airborne AIS receivers.

As the flight altitude increases, the receiving range continues to expand, as shown in the following table:

| Flight altitude m | Receiving radius km | Flight altitude m | Receiving radius km |
| --- | --- | --- | --- |
| 500 | 100 | 3000 | 234 |
| 1000 | 139 | 4000 | 269 |
| 2000 | 192 | 5000 | 300 |

Usually ship borne AIS equipment uses omnidirectional antenna, and adopts Self Organized Time Division Multiple Access (SOTDMA) or Carrier-sense Time Division Multiple Access (CSTDMA) to achieve multi-user Access. According to the relevant Recommendation, AIS equipment is generally transmitted on two VHF channels, AIS1 and AIS2. Each minute is divided into 2250 time slots. Each AIS message occupies 1 or more time slots. AIS ship borne equipment is generally divided into three types: Class A shipboard equipment using SOTDMA technology, Class B shipboard equipment using SOTDMA technology and Class B shipboard equipment using CSTDMA technology. The output power of AIS Class A and AIS Class B-SOTDMA ship borne equipment is 12.5 W (high power) or 1 W (low power), and the transmitter output power of the AIS Class B-CSTDMA shipboard equipment is 2 W. The reporting interval of the above three equipment is related to the speed and so on.

According to the SOTDMA or CSTDMA protocol, multiple AIS equipment will not overlap with multiple AIS signals transmitted in the same time slot in the same cell (generally with a radius of about 30 km). The SOTDMA or CSTDMA protocol allows long-distance ships to recover in time slot transmission, because VHF is line-of-sight and the receiver has certain co-frequency interference signal suppression performance, the multiplexed time slots of ships that are far apart do not cause interference. However, when the aircraft receives the AIS signal, on the one hand, due to the long distance from the ground, the transmission delay is large, even if the AIS signal is not transmitted in the same time slot, the receiving end will also receive signals that are aliased. On the other hand, as shown in FIG. 1, the coverage area of the aircraft is large, and the signals multiplexed in the above-mentioned time slots are simultaneously received by the aircraft, so that the aircraft will receive signals that overlap with each other. Therefore, the AIS signal in the airborne receiving system may have a time slot overlap, resulting in a conflict in time slot occupancy.

With the rapid increase in the number of received signals, a large number of AIS signals at sea enter the airborne AIS receiver in a mixed form, causing difficulties for reception. Therefore, it is necessary to establish a simulation and test system for airborne receiving AIS simulation on the ground. Simulation and test systems can increase the speed of airborne AIS development and reduce the cost of flight test.

The prior art simulates the AIS ship signal at sea through the following schemes:

1) The AIS analog signal is produced by the RF signal source or the vector signal source, which mainly simulates the AIS signal, but cannot simulate the scenario of multi-ship AIS, such as:

The Chinese patent document "An Automatic Identification System Signal Analog Source" (CN201320788950) discloses an automatic identification system signal analog source, which provides a hardware solution for simulating AIS signals.

2) Receive the real AIS ship radio signal and record and playback it through the radio recording and playback equipment;

3) Receive the actual AIS ship target data, as the initial value extrapolation simulation data and send it to the AIS simulation signal controlled by the vector signal source production program.

"Testbed for Performance Evaluation of SAT-AIS Receivers"(AndisDembovskis, Bremen, 2012 6th Advanced Satellite Multimedia Systems Conference (ASMS) and 12th Signal Processing for Space Communications Workshop (SPSC)) proposed a simulation method based on realistic data. This method receives real AIS ship target data through an aircraft. These data define the initial position of the ship as the initial value of the simulation, and then simulate the movement of the ship by linear extrapolation. The signal modulator simulates the AIS signal transmitted by the ship.

4) Simulate the AIS target through the computer, such as manually setting or using the AIS ship distribution data to simulate the AIS ship position, and then send the simulated AIS target to the AIS analog signal controlled by the vector signal source production program, such as:

Chinese patent document "Multi-channel multi-target satellite-borne AIS reconnaissance signal simulation system"

(CN107066693), discloses a system for simulating the dynamic AIS signal received by multi-target aliasing when the satellite-borne AIS multi-channel reconnaissance system is in orbit. The scene data generation software generates the multi-target multi-channel AIS baseband signal data file for satellite reception according to the scenario set by the user.

"Simulation Realization of Signal Simulation Source of Space borne AIS System" (Li Linyun, Chen Ping, Fang Li, Radio Engineering, 2014 44 (1)) proposed a method of using computer platform to design and implement space borne AIS signal simulation source. This method records the parameter information of all AIS signals received by the antenna during the satellite monitoring time in an Excel table as the input of the simulation source, so as to simulate the generation of the conflict signal received by the satellite antenna. By establishing the ship distribution model of the satellite detection range, the parameters in the Excel table are calculated according to the relative positions of the ship and the satellite, so the parameters are in line with the actual situation.

"Design of space borne AIS simulation system based on actual ship distribution" (Zhang Xin, Li Hongxing, Chen Ping, Fang Li, Radio Engineering, 2014, 44 (10)) proposes to calculate signals such as power, frequency offset and delay based on actual ship distribution data Parameters and simulate the AIS signal received by the satellite. This method first needs to build a ship distribution model according to the ship distribution. Ship distribution data can be captured from the navigation website on a regular basis, and a ship distribution model can be established based on multiple observation data to conform to the actual situation.

The above-mentioned existing solutions have the following disadvantages:

1) Scheme 1 AIS analog signals produced by radio frequency signal sources or vector signal sources cannot simulate complex scenarios.

2) Option 2 is expensive for airborne and space borne testing, and the radio recording and playback methods are costly.

3) Method 3 obtains the data through the airborne receiver. Due to the above-mentioned AIS signal time slot conflict, the number of AIS ships in the receiver is less than the real situation, and the real situation cannot be simulated.

4) Method 4 simulates the AIS transmission signal through the computer, but because AIS uses SOTDMA and CSTDMA protocols to determine the transmission time slot, the time slot selection is determined independently according to the surrounding ship transmission situation. The actual transmission time slot of a large number of ships is simulated by the computer. The complexity and cost are too high.

5) Judging from the current reception of airborne and space borne AIS equipment, mainly in areas where the AIS signal of coastal ships is dense, due to a large number of time slot conflicts due to air reception, the reception success rate is low; while in the offshore area, due to the small number of ships In the air, there is less conflict in the receiving slot in the air, and the receiving success rate is higher. Therefore, the focus of AIS signal simulation should be in coastal areas. The above solution does not provide a method for effectively simulating AIS signals in coastal areas under the airborne environment.

SUMMARY

The technical problem to be solved by the present invention is to provide a simulation system and testing method of AIS signals for airborne receiver, which can simulate the areas with intensive AIS signals of coastal ships, solve the problem that there is a big difference between the simulation test and actual use of airborne AIS at present, and can be used for the development of signal simulation and test equipment of airborne AIS.

The technical problem to be solved by the present invention is to provide a simulation system and testing method of AIS signals for airborne receiver, comprising multiple AIS receivers for receiving AIS signals of vessels, each AIS receiver being respectively connected to a timing unit, and the multiple AIS receivers being connected to a centralized processor by means of a communication network; the centralized processor for combining data of the multiple AIS receivers, deleting redundant data, and forming an AIS database; a flight simulator for manipulating an altitude and direction of an aircraft, and simulating a flight path of a real aircraft; and an AIS signal generator for incorporating the AIS database according to an aircraft position and a time point sent from the flight simulator, calculating all AIS signals received by the aircraft at the time point, and sending the AIS signals to an RF signal generator to generate VHF RF signals.

The simulation system of AIS signals for airborne receiver, wherein the AIS receivers are shore-based AIS base stations or airborne AIS receivers.

The simulation system of AIS signals for airborne receiver, wherein the timing unit using a GNSS (Global Navigation Satellite System) to generate time signals.

The technical problem to be solved by the present invention is to provide a testing method of a simulation system of AIS signals for airborne receiver, wherein the testing method comprising steps as follows: S1: receiving real AIS signals by multiple AIS receivers, solving and obtaining the transmitting parameters, message contents and vessels positions; S2: obtaining time information by the timing unit, adding a time stamp after each solved AIS data; S3: merging data from the multiple AIS receivers in the centralized processor, deleting redundant data according to the time stamp, forming the AIS database; S4: simulating the aircraft flight path by the flight simulator, the AIS signal generator generates the AIS signal of each time slot according to the aircraft position and the AIS database; S5: sending the generated AIS signal to the RF signal generator to be converted to the RF signal sending to the airborne AIS equipment under test.

The testing method of a simulation system of AIS signals for airborne receiver, wherein the simulation process of the flight simulator in step S4 is as follows: setting the starting parameters of the aircraft, comprising aircraft model, starting position, heading and speed, generating the flight path based on simulating the aerodynamic model of the aircraft; displaying the attitude of the aircraft by human-machine interfaces, and displaying the aircraft position by digital map, displaying the flight parameter information of the aircraft by simulation flight instruments, the flight parameter information comprising altitude, air speed and attitude.

The testing method of a simulation system of AIS signals for airborne receiver, wherein the AIS signal generation process in step S4 as follows: reading the AIS data of the current time slot from the AIS database, comprising message content, vessels position, transmission power, transmission time slot, time slot offset and transmission frequency; calculating the position distance Di between the vessels position and the air bone AIS receivers; calculating the delay caused by the position distance Di, and correcting the time slot offset according to the delay; calculating the signal attenuation Li caused by the position distance Di, and calculating the signal power received by the aircraft according to the signal attenuation Li; calculating the Doppler frequency shift fi caused by aircraft movement, and the frequency shift is corrected according to the Doppler frequency shift fi.

The testing method of a simulation system of AIS signals for airborne receiver, wherein the RF signal generator immediately generating a RF signal after receiving a signal from the AIS signal generator for each time slot, and then increases the time slot by one to continue generating a next RF signal; or until the test data generated by the AIS signal generator completing the generation of the test data of all time slots, and then generating a RF signal.

The testing method of a simulation system of AIS signals for airborne receiver, wherein the AIS database outputs the AIS data in real-time mode or play-back mode.

Compared with the prior art, the beneficial effects of the present invention are as follows: the simulation system and testing method of AIS signals for airborne receiver provided by the present invention, by receiving the actual coastal AIS signals, collecting and generating the AIS database in a large area, simulating and monitoring the flight situation through the flight simulator, generating all AIS signals that the aircraft can receive according to the aircraft position and time generated by the flight simulator, which is close to the actual receiving situation, so as to solve the problem that there is a big difference between the simulation test and the actual use of the airborne AIS It can be used in the signal simulation and test equipment development of airborne AIS.

DETAILED DESCRIPTION

The invention will now be further described below with reference to the accompanying drawings and examples.

Figure 1:
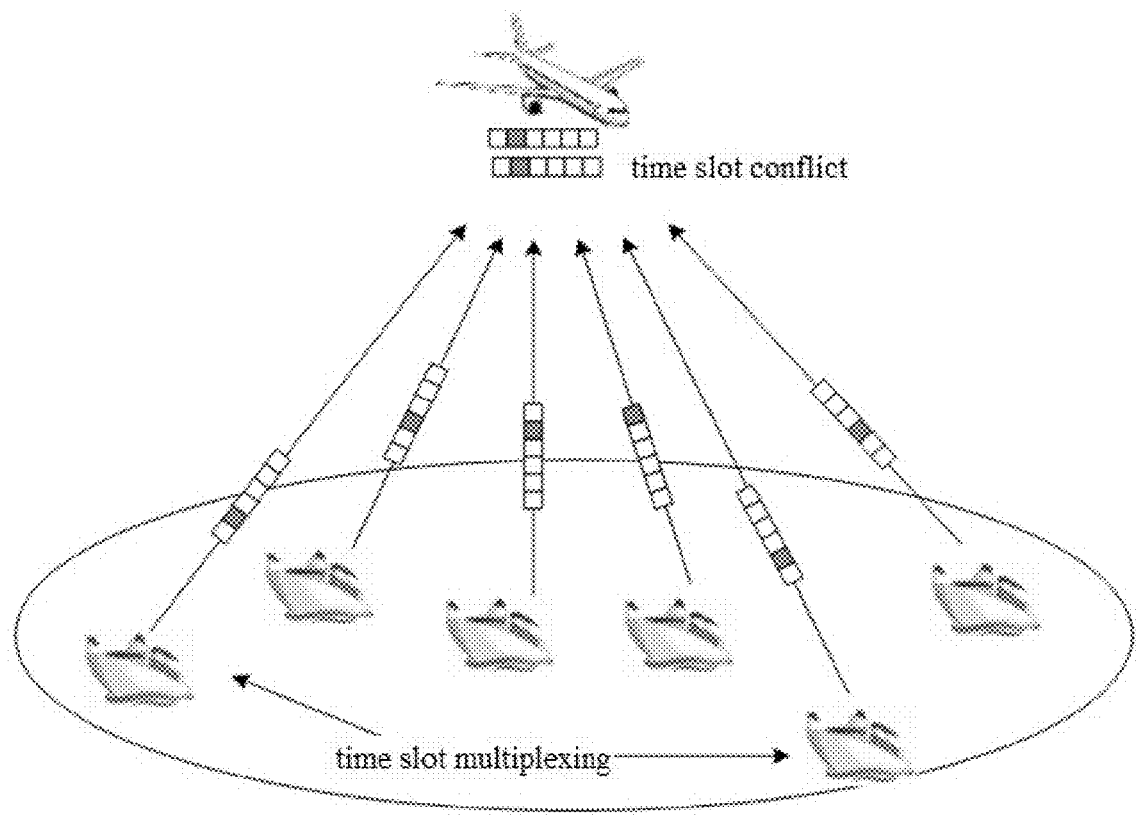
FIG. 1 is a schematic diagram of airborne AIS signal receiving range.
Figure 2:
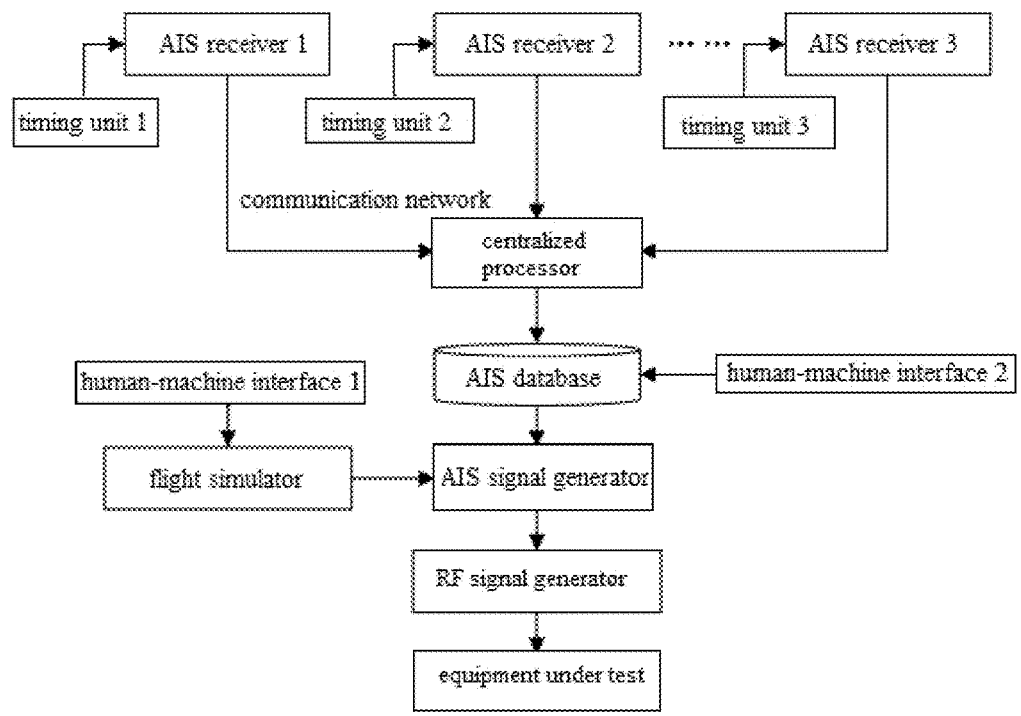
FIG. 2 is a structure schematic diagram of the simulation system of AIS signals for airborne receiver according to the present invention.
Figure 3:
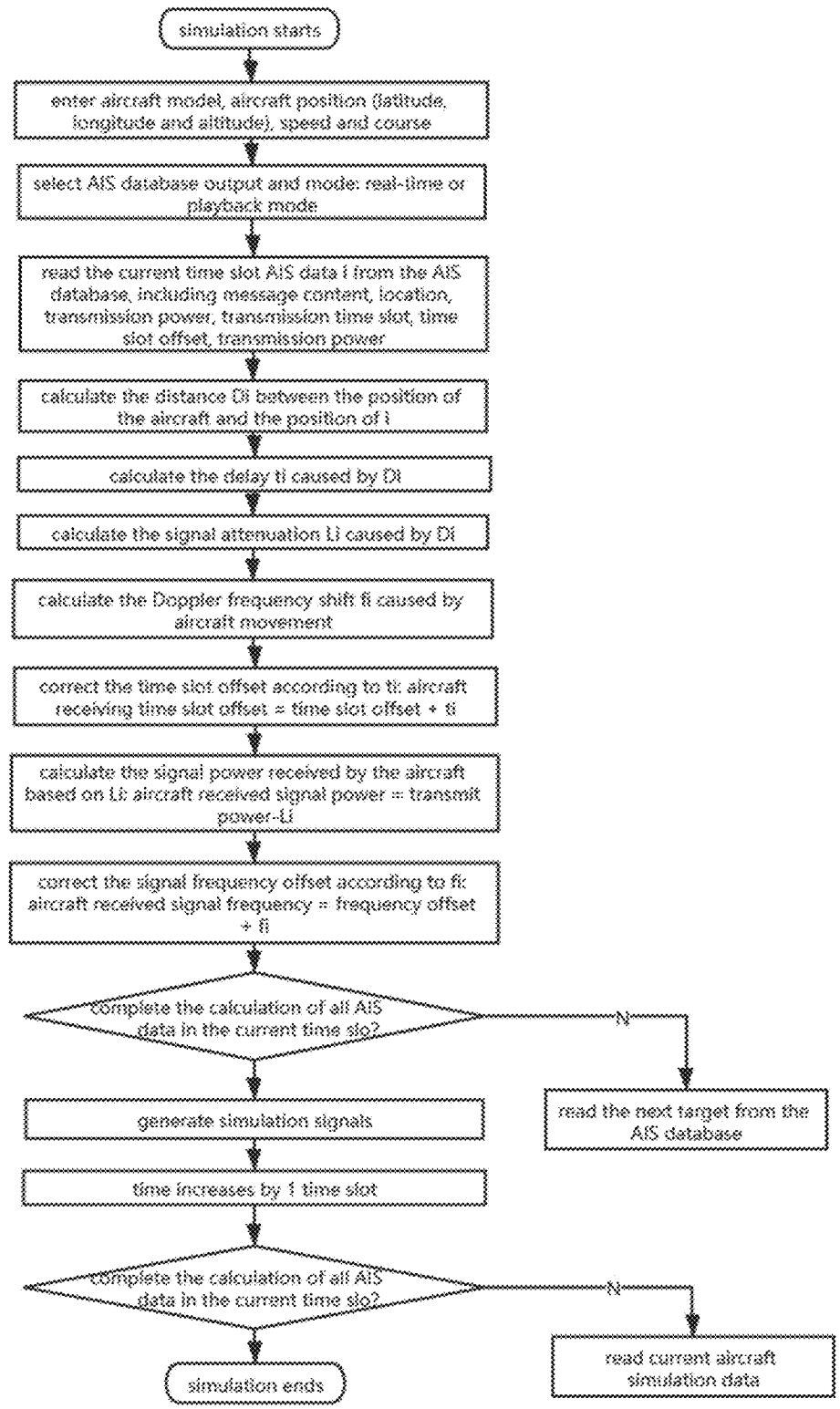
FIG. 3 is a schematic diagram of the analog signal generation process according to the present invention.

FIG. 2 is a structure schematic diagram of the simulation system of AIS signals for airborne receiver according to the present invention.

Please refer to FIG. 2, a simulation system of AIS signals for airborne receiver of the present invention, comprising:

multiple AIS receivers for receiving AIS signals of vessels, each AIS receiver being respectively connected to a timing unit, and the multiple AIS receivers being connected to a centralized processor by means of a communication network;

the centralized processor for combining data of the multiple AIS receivers, deleting redundant data, and forming an AIS database;

a flight simulator for manipulating an altitude and direction of an aircraft, and simulating a flight path of a real aircraft; and an AIS signal generator for incorporating the AIS database according to an aircraft position and time point sent from the flight simulator, calculating all AIS signals received by the aircraft at the time point, and sending the AIS signals to an RF signal generator to generate VHF RF signals.

The steps of the testing method of the simulation system of AIS signals for airborne receiver of the present invention are as follows:

S1: receiving real AIS signals by multiple AIS receivers, solving and obtaining the transmitting parameters, message contents and vessels positions;

S2: obtaining time information by the timing unit, adding a time stamp after each solved AIS data;

S3: merging data from the multiple AIS receivers in the centralized processor, deleting redundant data according to the time stamp, forming the AIS database;

S4: simulating the aircraft flight path by the flight simulator, the AIS signal generator generates the AIS signal of each time slot according to the aircraft position and the AIS database;

S5: sending the generated AIS signal to the RF signal generator to be converted to the RF signal sending to the airborne AIS equipment under test.

Receiving real AIS signals by multiple AIS receivers, solving AIS data which comprising transmitting parameters, message contents and ship positions; the AIS receivers obtaining time information by the timing unit, adding a time stamp after each solved AIS data.

The functions and implementation of the main device modules of the present invention are as follows:

1) The AIS receivers are used to receive ship AIS signals, including VHF antenna, AIS RF receiving, demodulation and decoding units. The ship AIS transmission power and transmission slot offset can be estimated. The AIS receivers may be shore-based AIS base stations or ship-borne AIS receivers.

2) The method of calculating the ship's AIS transmitting power: calculating the distance between the ship position and the AIS receivers position, and then using the distance to calculate the signal transmission attenuation. In calculating the ship transmitting power by using the transmission attenuation and the received signal power value, the above calculation algorithm is universal.

3) Calculation method of transmitting slot offset: calculating the distance between the ship position and the AIS receivers position, and then using the distance to calculate the signal transmission delay. Calculating the transmitting slot offset of the ship by using the time difference between the transmission delay and the start time of the relative standard slot, the above calculation algorithm is universal.

4) The timing unit uses GNSS (Global Navigation Satellite System) to generate the time signal.

5) The communication network is used to send AIS receivers data to the centralized processor. The communication network can be wired or wireless.

6) The centralized processor merges the data calculated by AIS receivers in several coastal areas. Because the receiving range of AIS receivers may overlap, there are multiple AIS receivers receiving signals from the same ship at the same time, resulting in redundant data generation. The centralized processor deletes the abundant data. After centralizing and deleting redundancy, AIS database is formed. The function of the centralized processor is to aggregate the data of multiple AIS receivers into a large area of AIS data.

7) The AIS database includes AIS ship message, ship position and launch parameter data in a period of time. AIS database has human-computer interface 2. Users can select data to simulate, including real-time data, data record and a section of data play-back of selection history.

8) The flight simulator has a human-machine interface 1, which can control and simulate the flight altitude and direction of the aircraft to generate any track. The flight simulator can simulate the aerodynamic model of the aircraft, close to the flight path of the real aircraft. It can set the starting parameters of the aircraft, including the aircraft model, starting position, heading and speed. The human-machine interface can display the attitude of the aircraft, the position of the aircraft is displayed on the digital map, and the flight parameter information, such as altitude, airspeed and attitude, is displayed on the simulation flight instruments.

9) The AIS signal generator calculates all AIS signals received by the aircraft at that time according to the aircraft position and time sent by the flight simulator and in combination with the AIS database. Each AIS signal includes the following parameters: radio parameters, messages, radio parameters including signal power, time slot and time slot offset, signal frequency offset, and messages including a complete AIS message format.

10) The RF signal generator can generate VHF RF signal according to the above parameters. The modulation content of the signal comes from the message content, and the radio signal is generated according to the radio parameters. RF signal generator can be a transmitter adopting software radio technology, a special AIS transmitter controlled by digital, or a general vector signal generator. The RF signal generator can generate signals in real time, that is, RF signals are generated immediately after each time slot receives signals from the AIS signal generator; or RF signals can be generated after the AIS signal generator completes the generation of test data of all time slots.

In summary, by receiving the actual coastal AIS signals in the present invention, collecting and generating the AIS database in a large area, simulating and monitoring the flight situation through the flight simulator, generating all AIS signals that the aircraft can receive according to the aircraft position and time generated by the flight simulator, which is close to the actual receiving situation. The specific advantages are as follows:

1) The AIS data of a large area is generated based on the real signals, which is close to the real situation of the coastal ship AIS. The present invention adopts a more concise method to simulate and produce a more realistic signal of the airborne AIS in the coastal environment, avoiding the complex simulation of the ship launch.

2) The invention operates the aircraft navigation through a flight simulator, which is close to the actual flight situation of the aircraft.

3) The present invention is close to the actual flight situation along the coast, including the received AIS radio signal and the flight path of the aircraft, which can save a lot of money for the development and testing of airborne AIS equipment.

While the present invention has been disclosed as above in preferred embodiments, it is not intended to limit the invention. Any person skilled in the art may make various improvement and modifications within the spirit and scope of the invention. Therefore, the scope of protection of the invention shall be subject to that defined in the claims.

What is claimed is:

1. A simulation system of AIS signals for airborne receiver, wherein comprising:
    multiple AIS receivers for receiving AIS signals of vessels, each AIS receiver being respectively connected to a timing unit, and the multiple AIS receivers being connected to a centralized processor by means of a communication network;
    the centralized processor for combining data of the multiple AIS receivers, deleting redundant data, and forming an AIS database;
    a flight simulator for manipulating an altitude and direction of an aircraft, and simulating a flight path of a real aircraft; and
    an AIS signal generator for incorporating the AIS database according to an aircraft position and time point sent from the flight simulator, calculating all AIS signals received by the aircraft at the time point, and sending the AIS signals to an RF signal generator to generate VHF RF signals.

2. The simulation system of AIS signals for airborne receiver according to claim 1, wherein the AIS receivers are shore-based AIS base stations or airborne AIS receivers.

3. The simulation system of AIS signals for airborne receiver according to claim 1, wherein the timing unit using a GNSS (Global Navigation Satellite System) to generate timing signals.

4. A testing method of a simulation system of AIS signals for airborne receiver, using the simulation system of AIS signals for airborne receiver according to claim 1, wherein the testing method comprising steps as follows:
    S1: receiving real AIS signals by multiple AIS receivers, solving and obtaining the transmitting parameters, message contents and vessels positions;
    S2: obtaining time information by the timing unit, adding a time stamp after each solved AIS data;
    S3: merging data from the multiple AIS receivers in the centralized processor, deleting redundant data according to the time stamp, forming the AIS database;
    S4: simulating the aircraft flight path by the flight simulator, the AIS signal generator generates the AIS signal of each time slot according to the aircraft position and the AIS database;
    S5: sending the generated AIS signal to the RF signal generator to be converted to the RF signal sending to the airborne AIS equipment under test.

5. The testing method of the simulation system of AIS signals for airborne receiver of claim 4, wherein the simulation process of the flight simulator in step S4 is as follows:
    setting the starting parameters of the aircraft, comprising aircraft model, starting position, heading and speed, generating the flight path based on simulating the aerodynamic model of the aircraft;
    displaying the attitude of the aircraft by human-machine interfaces, and displaying the aircraft position by digital map, displaying the flight parameter information of the aircraft by simulation flight instruments, the flight parameter information comprising altitude, air speed and attitude.

6. The testing method of the simulation system of AIS signals for airborne receiver of claim 4, wherein the AIS signal generation process in step S4 as follows:
    reading the AIS data of the current time slot from the AIS database, comprising message content, vessels position, transmission power, transmission time slot, time slot offset and transmission frequency;
    calculating the position distance $D_i$ between the vessels position and the airborne AIS receiver;
    calculating the delay caused by the position distance $D_i$, and correcting the time slot offset according to the delay;
    calculating the signal attenuation $L_i$ caused by the position distance $D_i$, and calculating the signal power received by the aircraft according to the signal attenuation $L_i$;

calculating the Doppler frequency shift fi caused by aircraft movement, and the frequency shift is corrected according to the Doppler frequency shift fi.

7. The testing method of the simulation system of AIS signals for airborne receiver of claim 4, wherein the RF signal generator immediately generating a RF signal after receiving a signal from the AIS signal generator for each time slot, and then increases the time slot by one to continue generating a next RF signal; or until the test data generated by the AIS signal generator completing the generation of the test data of all time slots, and then generating a RF signal.

8. The testing method of the simulation system of AIS signals for airborne receiver of claim 6, wherein the AIS database outputs the AIS data in real-time mode or playback mode.

* * * * *